Aug. 19, 1947.  G. DEN BESTEN ET AL  2,426,002
FIFTH WHEEL
Filed Oct. 26, 1944   3 Sheets-Sheet 1

Inventors
Gerrit Den Besten
Cornelius Den Besten
By Liverance & Van Antwerp
Attorneys Aug. 19, 1947.   G. DEN BESTEN ET AL   2,426,002
FIFTH WHEEL
Filed Oct. 26, 1944   3 Sheets-Sheet 3

Inventors
Gerrit DenBesten
Cornelius DenBesten
By
Attorneys

Patented Aug. 19, 1947

2,426,002

UNITED STATES PATENT OFFICE 2,426,002

FIFTH WHEEL

Gerrit Den Besten, Newton, Iowa, and Cornelius Den Besten, Corsica, S. Dak.

Application October 26, 1944, Serial No. 560,434

10 Claims. (Cl. 280—33.1)

This invention relates to fifth wheels and is directed to the production of a strong, durable, effective fifth wheel construction used in general for the connection of trailers to trucks, tractors or the like which are to pull them, and by means of which an automatic connection may be made by backing the pulling vehicle such as a truck of tractor into proper relation with respect to the trailer and also in which a ready and easy disconnection may be manually made when desired, utilizing our novel construction of fifth wheel for such purposes.

The invention and a construction embodying the same which we have devised is disclosed in the following description, taken in connection with the accompanying drawings, in which Fig. 1 is a general side elevation of the fifth wheel and the pin with which it is to be connected in connecting a trailer with a power operated pulling vehicle.

Like reference characters refer to like parts in the different figures of the drawings.

Figure 1:
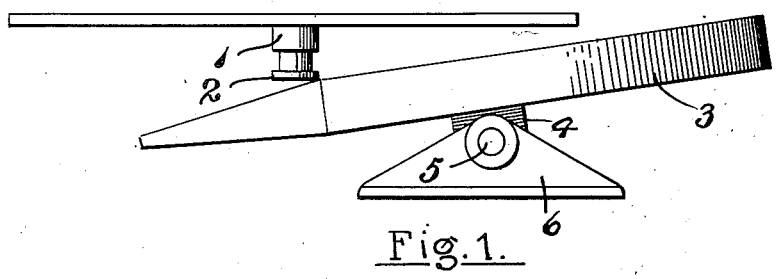

A fifth wheel construction is ordinarily mounted at the rear upper portion of a tractor or truck and has its releasable connection with a vertical pin extending below the lower side and at the front end portion of the trailer. As shown in Fig. 1, the pin 1 of cylindrical form is grooved continuously around at a short distance above its lower end, providing an annular head 2 below the groove.

Figure 2:
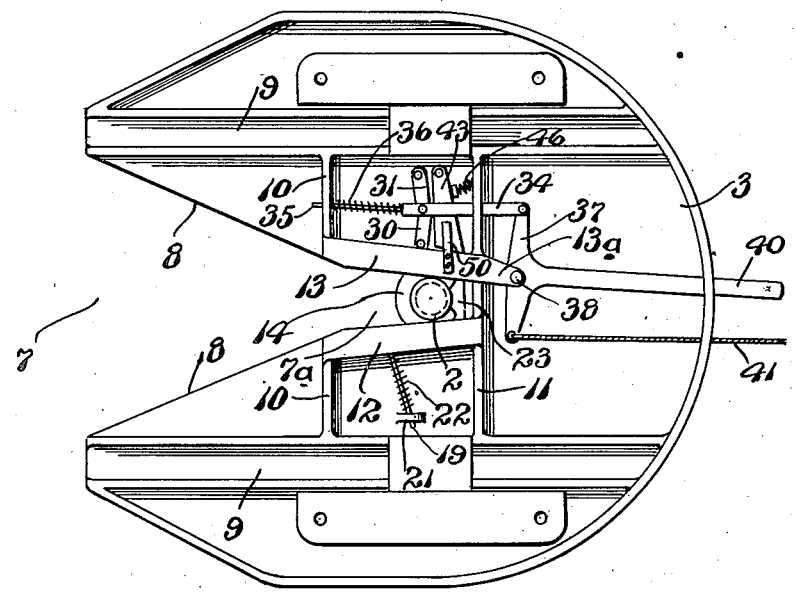
Fig. 2 is an under plan view of the fifth wheel construction.

The fifth wheel includes a body 3 of cast metal from the under side of which spaced apart lugs 4 extend adapted to be pivotally mounted upon pivots 5 to connect the body member 3 with suitable brackets 6 which in turn are secured to the truck or tractor. This is conventional structure and need not be further outlined. At a side of the body it is cut away to provide a wide entrance slot 7 having converging sides 8 which, a short distance from the central portion of the body 3, joins with a narrower slot 7a, the sides of which converge slightly toward each other but in general approach parallelism as shown in Fig. 2. The body 3 of the fifth wheel is strengthened and reinforced at its under side by longitudinal ribs 9 and spaced transverse ribs 10 and 11 between the longitudinal ribs, and at the opposite sides of the slot 7a integrally cast flat bars 12 connect the transverse ribs 10 and 11 as shown and are spaced from the upper side of the body 3. Also as indicated in Fig. 2, a reinforcing rib extends around the outer edge portions of the fifth wheel body from one side of the entrance slot 7 to the other side thereof. In connecting the fifth wheel structure to the pin 1, said pin is guided into the inner slot portion 7a until it reaches its operative position and is automatically connected with the fifth wheel.

A holding member 14 is pivotally mounted at one end at 15 between the upper side of the body 3 and the bar 12 in a position such that when, as in Fig. 4, it is swung across the inner end portion of the inner slot 7a, it bridges the slot and may engage with and hold the pin connected to and depending below the trailer body; and said holding member 14 at its inner side is shaped to engage against the pin above the head 2 at its lower end. Said holding member 14 adjacent the pivot 15 and at its outer side is provided with an integral lug 16 to which a generally triangular shaped member 17 is pivotally mounted at one corner at 18. At another corner a rod 19 has a pivotal connection at 20, the rod extending through a lug cast with and depending from the body 3. A coiled spring 22 around the rod 19 engaging at one end against the lug 21 normally tends to turn the triangular member 17 in a clockwise direction with the line of force of the spring passing to the left of the axis of pin 15, as in Fig. 4.

Figure 6:
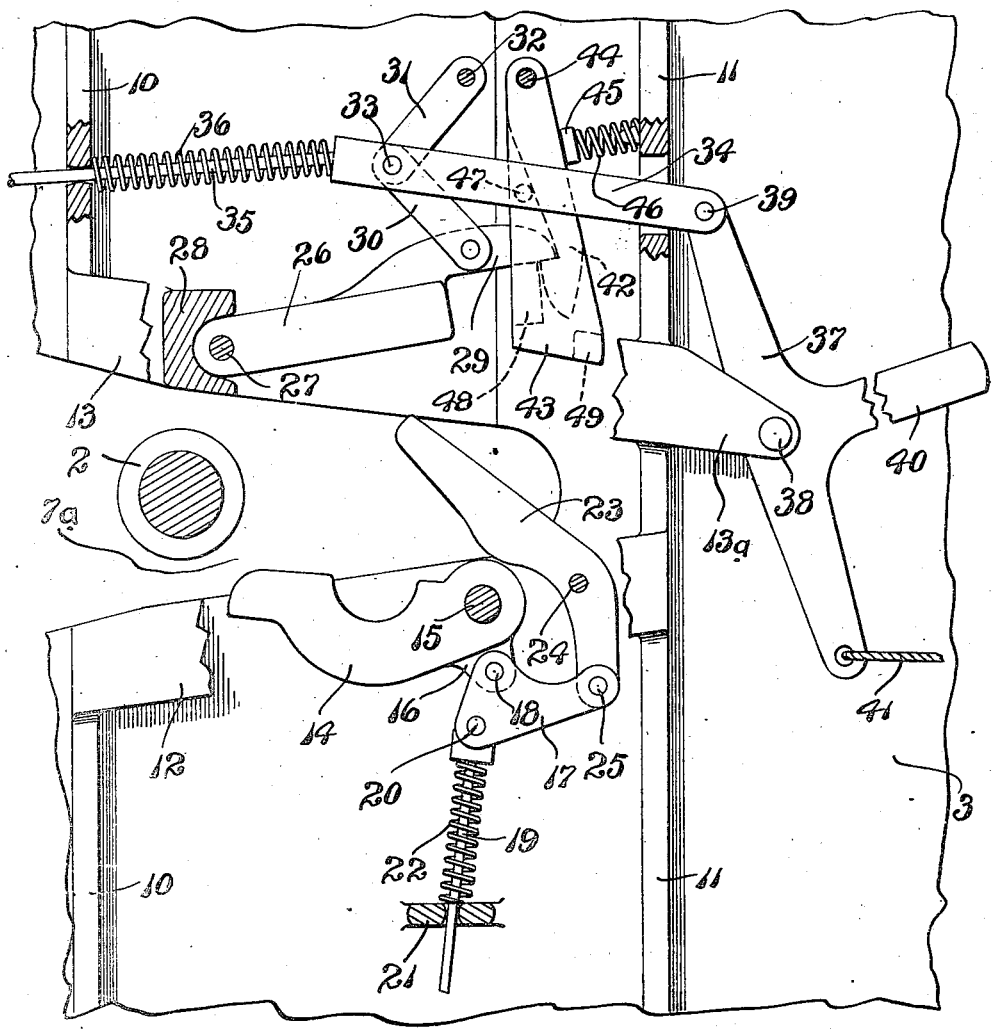
Fig. 6 is an under plan view similar to Fig. 4 with the parts of the fifth wheel construction in released position.

A lever 23 is pivotally mounted between its ends at 24 inward of the pivot 15, said pin 24 extending between the bar 12 and the body 3 of the structure, and said lever 23 is pivotally connected at one end at 25 to the third corner of the member 17 as shown. In one position, as in Fig. 4, said lever 23 is located back of the pin 1 depending from the trailer body and in another position, as shown in Fig. 6 is swung to a position where its free end portion extends across the inner slot 7a so that on relative movement of the pin 1 with respect to the lever 23 the two are brought together and the lever swung from the position in Fig. 6 to that in Fig. 4.

A bar 26 is pivotally mounted at 27 at the opposite side of the inner entrance slot portion 7a and normally lies between the body 3 of the fifth wheel structure and the bar 13. At its pivoted end it is backed by a strong post 28. When in operative position, as in Fig. 4, it engages against the free end of the holding member 14. At the free end portion of the member 26 a finger 29 is provided integral therewith offset so as to extend beyond the free end of the member 14 as shown.

A toggle lever structure is provided consisting of two toggle links 30 and 31, the first of which is pivotally connected at one end to the finger 29, the second pivotally connected at its outer end at 32 to the body 3. Said links at their meeting ends have pivotal connection on a pivot 33 which is carried at the free end portion of a bar 34 which extends through an opening in the reinforcing rib 11 as shown in Figs. 4 and 6. At its free end portion a rod 35 is connected with the bar 34, said rod extending to and through an opening in the transverse rib 10 with a coiled spring 36 around the rod 35 which normally tends to move the bar 34 in the direction of its length inwardly through the opening in the rib 11.

Bar 13 previously described is extended inwardly of the reinforcing rib 11 in a terminal arm 13a. A bar 37 is pivotally mounted at 38 between its ends, pivot 38 extending through the free end portion of the arm 13a and connected with the body 3 of the structure. One end of the bar 37 is pivoted at 39 to the inner end of the bar 34. A handle 40 extends from the middle portion of the bar 37 opposite the entrance slot and beyond the body 3 (Fig. 2). A cable 41 is connected to the other end of the bar 37, it being evident that said bar 37 may be manually operated by either the handle 40 or by pulling on the cable 41.

Figure 3:
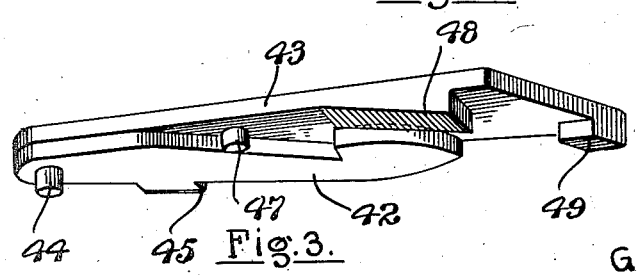
Fig. 3 is a perspective view of the immediate latching mechanism which holds the parts in operative position.
Figure 7:
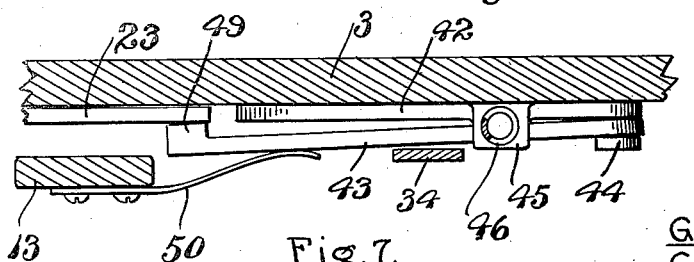
Fig. 7 is a vertical section substantially on the plane of line 7—7 of Fig. 4, looking in the direction indicated.

A latching hook 42 of flat metal and a member 43 are located in superimposed relation with the hook over the member 43 both being pivotally connected with the body 3 at one end at 44. The pivotal connection of the member 43 with said pin is a relatively loose connection so that the free end of member 43 would normally have a tendency to tilt downwardly or occupy the position shown in Fig. 7. An ear 45 integral with the latching hook 42 is turned therefrom and passes alongside an edge of the member 43, said ear being engaged by coil spring 46 disposed between it and the adjacent transverse reinforcing rib 11 (Figs. 4 and 6). The member 43 at its upper side carries a pin 47 engaging against the latch hook 42 at the opposite edge and said member 43 at its upper side is provided with two spaced upwardly extending lugs 48 and 49, the former of which is located adjacent one edge but a short distance from the free end of the member and has an inclined surface as best shown in Fig. 3. The lug 49 is at the free end and inner corner of said member 43. While normally the member 43 would incline in a downward direction toward its free end, it is engaged at its under side by a leaf spring 50 (Figs. 2 and 7) connected to the part 13 and bearing against the under side of said member 43 to lift it into horizontal position.

In the connected position of the pin with the fifth wheel (Fig. 4) the member 26 is held securely in holding engagement against the holding member 14 by reason of the position of the toggle links 31 and 30, the line joining the pivotal axis of the outer pivots of said links passing to the left of the axis of the pivot 33. Therefore, any force exerted by the pin 1 against the holding member 14 is transmitted through the member 26 to the heavy post 28 and there can be no outward movement and disconnection of the member 26 from the holding member 14 until bar 34 is moved to the left by a manual operation of bar 37, either through turning it about its pivot 38 by the handle 40 or pulling upon the cable 41.

Figure 4:
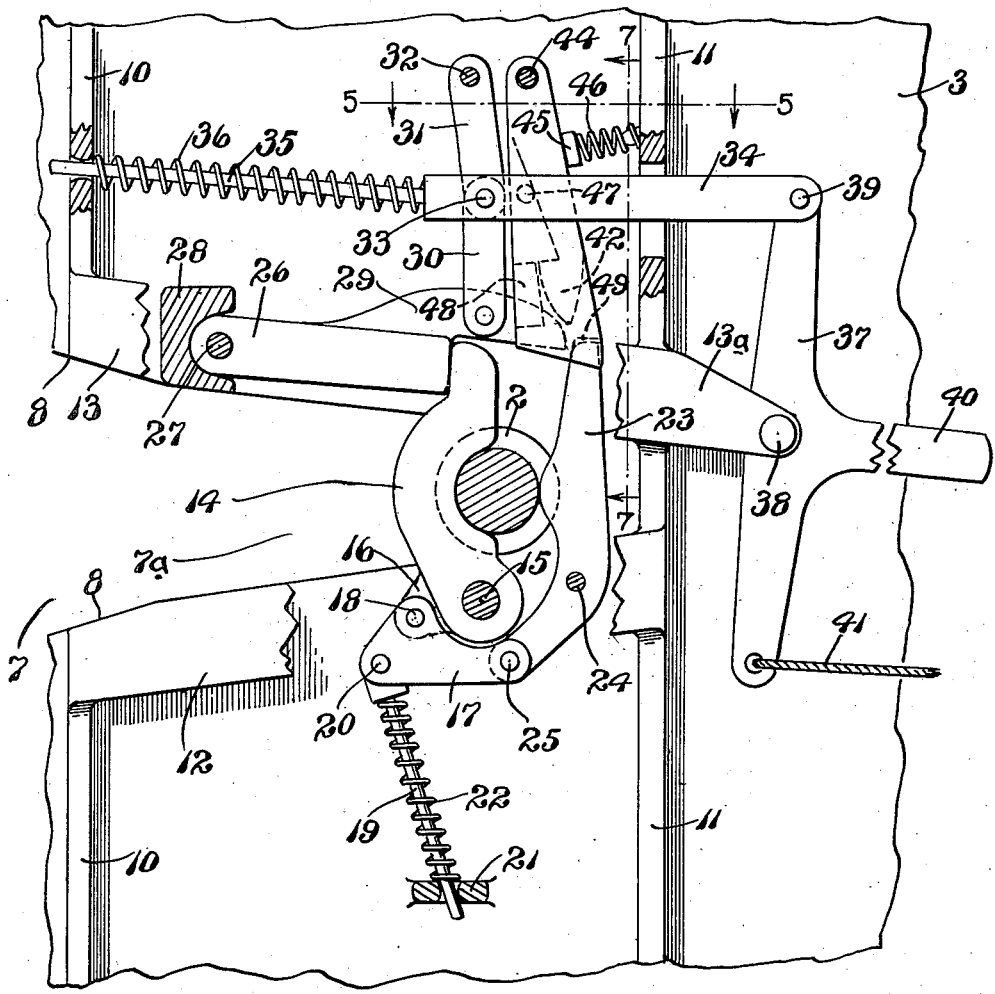
Fig. 4 is a fragmentary enlarged under plan view of the fifth wheel construction, showing the position of the parts when in operative position, and with certain parts broken away and shown in section for a better disclosure.
Figure 5:
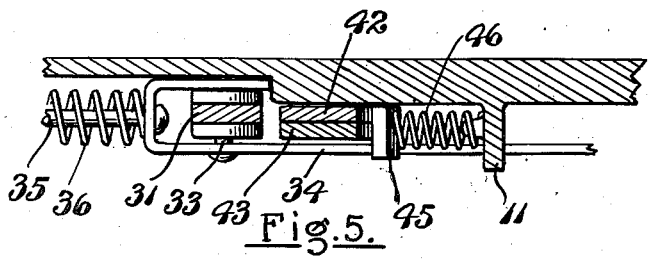
Fig. 5 is a fragmentary vertical section substantially on the plane of line 5—5 of Fig. 4, looking in the direction indicated.

When the trailer and its pulling truck or tractor are to be disconnected, bar 37 is manually turned as mentioned, moving the bar 34 from the position in Fig. 4 to that shown in Fig. 6. This compresses the spring 36 and swings the toggle links as shown in Fig. 6, with a resultant turning of the member 26 about its pivot 27 counter-clockwise. The finger 29 riding against the nose of the latch 42 causes a compression of the spring 46 until the end of the finger 29 is engaged in the recess of the hook so that the latching hook 42 holds member 26 in inoperative position and spring 36, which has been compressed, cannot move the parts back to their initial position until a release of the latching hook 42 from the finger 29 has occurred.

The swing of the member 26 from the position in Fig. 4 to that in Fig. 6 releases the lever 23, whereupon movement of the truck or tractor carrying the fifth wheel away from the trailer, the pin 1 remaining stationary, the fifth wheel structure is moved away from it swinging the holding member 14 to the position shown in Fig. 6 and with the triangular member 17 and the lever 23 being moved therewith because of the connections described. Upon such swinging movement occurring the line of force of the spring 22 is carried across the pivot 18 so that spring 22 holds the parts in position as in Fig. 6.

On a reconnection of the fifth wheel with the pin 1, backing the truck or tractor into place carries said fifth wheel to a position such that the pin relatively moves inwardly through the slots 7 and 7a until an engagement of said pin and the lever 23 occurs. Lever 23 is thereupon turned clockwise about the pivot 24, and as soon as the movement has progressed far enough that the line of force of spring 22 crosses the axis of pivot 18 the parts are snapped into closing position with the free end of lever 23 engaging against the outer side of the lug 49 and swinging the member 43 counter-clockwise about pivot 44. Because the spring 50 holds the member 43 in an upper position the inner edge of the lug 43 will engage the hook portion of the latch 42 and move it counter-clockwise thereby freeing the finger 29 from the latch and permitting the spring 36 to expand and move the bar member 26 into its operative position against the free end portion of the holding member 14, that is, into the position shown in Fig. 4. On such movement the free end portion of the finger 29 rides over the inclined outer surface of the lug 48 and depresses the member 43 against the lifting force of the spring 50, lowering the lug 49 a sufficient distance that the free end of the lever 23 may pass thereover to occupy the position.

It is of course apparent that the head 2 at the lower end of the pin is located in part underneath the holding member 14 and in part underneath the adjacent side of the lever 23 (Fig. 4) preventing any disengagement by an upward movement of the pin. The connection of the tractor and trailer is thus made automatically by backing the trailer into position while the disconnection may take place at any time desired by manually operating bar 23 either by the handle 40 or cable 41 connected therewith.

The novel construction described is sure and effective in its operation, strong and durable and is insured against disconnection of the trailer occurring except when, through manual operation, a release is wanted. The invention is defined in the appended claims and is to be considered comprehensive of all forms of structure coming within their scope.

We claim:

1. A fifth wheel comprising, a body having an entrance slot with one end closed, a holding member pivotally mounted at one side of said slot near the closed end and adapted to swing across said slot to retain a pin therein, a locking bar pivotally mounted on said body and having a swinging end engageable with the swinging end of said holding member to lock it in pin retaining position, the pivot of said locking bar being in substantially direct alinement with the thrust of said holding member thereagainst, a toggle joint retaining device connected to said locking bar and the body and serving to move said locking bar into or out of locking position, the links of said toggle joint being in substantially straight line position when retaining the locking bar in locking position and manual means for operating said toggle joint to move the locking bar out of locking position.

2. A construction having the elements defined in claim 1 and a trip lever pivotally mounted on the body and connected with the holding member to be swung across said entrance slot, whereby it is operated upon by said pin entering the slot to thereby swing said holding member across the slot at the opposite side of said pin.

3. A construction as defined in claim 1, and a trip lever pivotally mounted on said body, means connecting said lever with said holding member, the free end portion of the lever being adapted, when the holding member is in a position at a side of the slot, to be swung into position in relation to the slot for engagement against a pin entering the slot to thereby swing said trip lever and the holding member connected therewith to move said holding member across the slot and at the opposite side of the pin, and spring means associated with said holding member, trip lever and the means connecting them for yieldingly holding the holding member in either of its two extreme positions in one of which it is at a side of the slot and in the other extended across it.

4. The elements of claim 1 combined with means for latching said locking bar in released position and automatic means operated by entrance of a pin into said slot for unlatching said locking bar from released position.

5. The elements of claim 1 combined with latching means to hold said locking bar out of locking position, spring means to move the locking bar into locking position and automatic means actuated by entrance of a pin into said slot acting to move said holding member to holding position and to unlatch said latching means to permit the locking bar to move into locking position.

6. In a fifth wheel, a body having an entrance slot extending from one side thereof substantially to the central portion of the body, said entrance slot being closed at its inner end, a holding member pivotally mounted on and at the under side of the body at one end and adapted to occupy two extreme positions, one at a side of the entrance slot and another extending thereacross a short distance from the inner closed end of said slot, a bar pivotally mounted at one end on said body at the opposite side of the slot and adapted in one position to lie substantially parallel to the slot and against the free end of said holding member, spring means normally moving said bar into the last mentioned position, manually operable means for swinging said bar about its pivot away from said slot at its free end to release the holding member, a finger extending from the free end of the bar, and a latch moved in one direction by a spring means having a free end adapted to be engaged by said finger when the bar is swung away from the slot and having hook means for engaging said finger after a predetermined movement thereof to thereby hold the bar away from the entrance slot.

7. In a fifth wheel, a body having an entrance slot extending from one side thereof o the central portion of the body, said entrance slot having a closed inner end, a holding member pivotally mounted at one end at the under side of the body at a side of the slot and a short distance outward from the closed end thereof, a trip lever pivotally mounted between its ends at the under side of the body, the pivotal mounting of said lever being inwardly a short distance from the pivot of said holding member, a triangular member pivotly connected at one corner to an end of said trip lever and at another corner to said holding member, the pivotal connection of the triangular member to the holding member and the pivots of said holding member and trip lever being in substantial alinement when the holding member is across said slot, a rod pivotally connected to the third corner of said triangular member, a lug extending downwardly from said body through which the outer end of the rod slidably passes, and a coiled spring between said lug and said triangular member, said trip member when the holding member is across said slot being located in general parallelism thereto and when the holding member is at a side of the slot having its free end portion extending diagonally across the inner end portion of the slot to be engaged by a pin entering therein and swung by said engagement upon said pin approaching the closed inner end of the slot, said spring normally holding said holding member and said trip lever in two extreme positions to which they are movable, as specified.

8. A construction having the elements defined in claim 7, and a locking bar pivotally mounted at one end at the under side of the body and at the opposite side of the slot and adapted to be moved into a position in substantial parallelism to said slot and engage against the free end portion of the holding member when it is located transversely across said entrance slot, combined with releasable means for locking said locking bar in such position.

9. A construction having the elements defined in claim 7, and a bar pivotally mounted at one end at the under side of the body and at the opposite side of said entrance slot and adapted to be moved into a position substantially parallel to the entrance slot in which position it engages said holding member at its free end to hold it against pivotal movement, a toggle link structure having the outer end of one link pivotally connected to said bar and the outer end of the other link pivotally connected to said body, and spring means acting on said toggle links to normally move them into a position whereby said bar is moved into a position to engage against the free end portion of the holding member.

10. A construction having the elements defined in claim 7, and a bar pivotally mounted at one end at the under side of the body and at the opposite side of said entrance slot, in one position being adapted to lie substantially parallel to said entrance slot and against the free end portion of said holding member, two toggle links pivotally connected at adjacent ends and at their outer ends having pivotal connections, one to said bar and the other to said body, a bar connected with the pivot joining said toggle links, spring means acting against one end of said bar for moving the toggle links into position to thereby move said first mentioned bar into position to engage the holding member, and manually operable means connected with the opposite end of the second mentioned bar for moving it longitudinally against said spring means and move the toggle links to withdraw the first bar from its position wherein it locks the holding member against movement.

GERRIT DEN BESTEN.
CORNELIUS DEN BESTEN.

REFERENCES CITED

The following references are of record in the file of this patent:

UNITED STATES PATENTS

| Number | Name | Date |
|---|---|---|
| 1,929,220 | Steinhauer | Oct. 3, 1933 |
| 1,958,723 | Spencer | May 15, 1934 |
| 1,991,507 | Ketel | Feb. 19, 1935 |
| 2,041,124 | Francis | May 19, 1936 |
| 2,077,484 | King | Apr. 20, 1937 |